Nov. 4, 1930.　　　A. A. CANTON　　　1,780,336
PUMPING MECHANISM
Filed Dec. 31, 1928
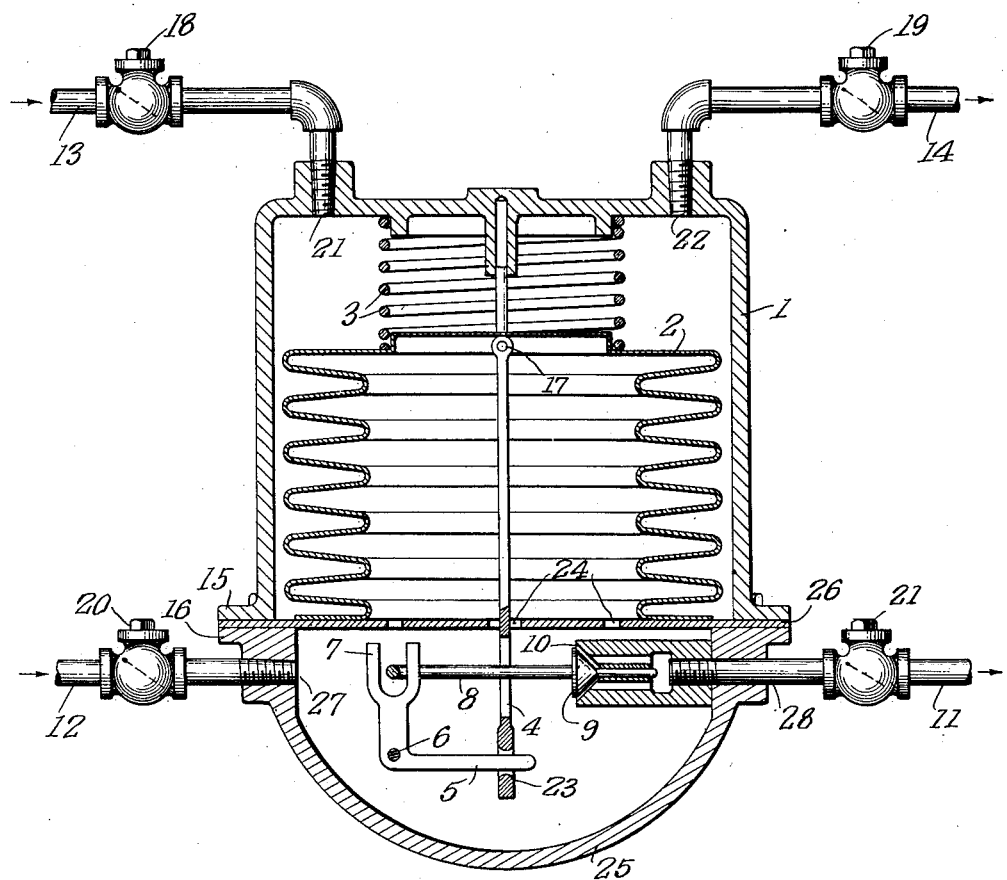
INVENTOR
Allen A. Canton Patented Nov. 4, 1930

1,780,336

UNITED STATES PATENT OFFICE

ALLEN A. CANTON, OF NEW YORK, N. Y., ASSIGNOR TO GLACIER, INC., OF THE STATE OF NEW YORK

PUMPING MECHANISM

Application filed December 31, 1928. Serial No. 329,572.

This invention relates to pumping devices. The object is to provide a pump to pump fluids or gases by utilizing the pressure exerted upon another fluid or gas by any of the standard pumping devices or compressors in use.

Another object of this invention is to provide means of causing one fluid under compression to compress or pump a second fluid without the two fluids mixing.

Another object of this invention is to provide means whereby the pressure exerted by a fluid under compression may be utilized to circulate a second fluid.

Another object of this invention is to provide means for utilizing a pumping action of one pump to circulate or pump two or more fluids, without any possibility of their intermingling.

Another object is to provide a pump having no packing glands.

Other objects of this invention may appear by study of the attached drawing and the following descriptions:

In the drawing numeral 1 designates a cylindrical casing and 25 a bottom casing. The two casings are separated at the flanges 15 and 16 by a plate 26 having therein a number of perforations 24. The case 1 is provided with an inlet pipe 13 entering the tap 21 and an outlet pipe 14 entering the tap 22. In the inlet and outlet pipes are provided check valves 18 and 19.

The casing 25 is formed with taps 27 and 28 into which are screwed the intake pipe 12 and outlet pipe 11. In these pipes are check valves 20 and 21.

At the inner end of the pipe 11 is a valve seat 10 in which sits a valve 9. This valve is provided with an extended rod 8 having its end situated between two prongs of the fork 7. The bottom of the fork is formed in the shape of a bell crank lever 5 which is free to pivot on the pivoting point 6. The lower arm of the bell crank lever fits into the center of the slot 23 formed in the rod 4. This rod 4 extends through the center hole 24 of the plate 26 to the upper part of the bellows 2 made of metal or any flexible material and is pivoted at the pivot 17.

The bottom of the bellows is firmly attached to the plate 26. On the external side of the bellows 2 inside of the case 1 is placed a helical spring 3. The top of the spring is in contact with the top member of the casing 1 and the lower part of the spring rests on the bellows 2.

The operation of this device is as follows:

The flexible bellows 2 are held in a compressed position by the helical spring 3. When the inlet pipe 12 is attached to the high pressure side of a compressor and the outlet pipe 11 to the low pressure side of the compressor, the compressed fluid entering case 25 at 27, is unable to continue through pipe 11 on account of that pipe being closed by valve 9. The compressed fluid enters through the perforations 24 and filling the flexible bellows 2 causes bellows to expand. The expansion causes the rod 4 to rise and lift the bell crank lever 5 about its pivot 6. The fork 7 then pulls the rod 8 and opens valve 9, releasing the compressed fluid into the outlet pipe 11. Upon the release of the pressure in the bellows the helical spring forces the bellows to compress, thereby transmitting the motion through the rod 4 and bell crank lever 5. The fork 7 will then close the valve 9, permitting the inflowing fluid from 12 to again build up a pressure.

This expansion and contraction of the flexible bellows 2 effects a pumping motion in the space inside of case 1 and outside of bellows 2. This reciprocating motion causes the fluids entering through pipe 13 and inlet 21 to be pumped out through outlet 22 and pipe 14. The check valves 18, 19, 20 and 21, operate in the manner well known to the art.

It is obvious that by attaching a number of the pumps above described in series, it is possible to circulate any number of fluids without any possibility of their intermingling. This pump finds application in many industries. For instance:

By connecting the pipes 11 and 12 across the radiator pump of an automobile, the bellows may be used to pump gasoline into the carburetor through pipe 13 into the inside of case 1 and through pipe 14. To accomplish a similar purpose, pipes 12 and 11 may be connected across the oil pump of an automobile. This pump may also be used in the refrigerating industry, where it is necessary to circulate a cooling fluid from the compression coils. In this case, pipe 11 and 12 are attached in series with the compression coils and pipes 13 and 14 connected across a radiator. The pumping of a refrigerant in the compression coils or through the inside of the bellows 2, makes the bellows circulate a cooling liquid through the radiator and through a jacket around the compression coils.

The pump above described finds many more uses and applications as those acquainted with the art can readily see. While I have shown only the design in the accompanying drawing, it is obvious that my invention is susceptible to various changes and supplications without departing from the spirit and scope thereof.

What I claim is:—

1. A pump comprising a casing, a plate dividing said casing into upper and lower chambers and extending entirely across the space within the casing, said plate having perforations in its central portion, a bellows diaphragm in said upper chamber having its lower end open and its upper end closed, the lower end of the diaphragm being secured to said plate around the perforations therein, an inlet pipe opening into the lower chamber and provided with a check valve opening toward the lower chamber, an inwardly opening control valve at the inner end of said outlet pipe, a valve actuating device arranged to open said control valve upon the bellows being inflated, and inlet and outlet pipes provided with check valves and communicating with said upper chamber.

2. A pump comprising a casing, a plate dividing said casing into upper and lower chambers and extending entirely across the space within the casing, said plate having perforations in its central portion, a bellows diaphragm in said upper chamber having its lower end open and its upper end closed, the lower end of the diaphragm being secured to said plate around the perforations therein, an inlet pipe opening into the lower chamber and provided with a check valve opening toward the lower chamber, an inwardly opening control valve at the inner end of said outlet pipe, a valve actuating device arranged to open said control valve upon the bellows being inflated, inlet and outlet pipes provided with check valves and communicating with said upper chamber, and a compression spring bearing at one end against the top of said upper chamber and at its other end on top of said bellows to collapse the latter.

3. A pump comprising a casing, a plate dividing said casing into upper and lower chambers and extending entirely across the space within the casing, said plate having perforations in its central portion, a bellows diaphragm in said upper chamber having its lower end open and its upper end closed, the lower end of the diaphragm being secured to said plate around the perforations therein, an inlet pipe opening into the lower chamber and provided with a check valve opening toward the lower chamber, an outwardly opening check valve in said outlet pipe, an inwardly opening control valve at the inner end of said outlet pipe, a valve actuating device arranged to open said control valve upon the bellows being inflated, and inlet and outlet pipes provided with check valves and communicating with said upper chamber.

4. A pump comprising a casing, a plate dividing said casing into upper and lower chambers and extending entirely across the space within the casing, said plate having perforations in its central portion, a bellows diaphragm in said upper chamber having its lower end open and its upper end closed, the lower end of the diaphragm being secured to said plate around the perforations therein, an inlet pipe opening into the lower chamber and provided with a check valve opening toward the lower chamber, an outwardly opening check valve in said outlet pipe, an inwardly opening control valve at the inner end of said outlet pipe, a valve actuating device arranged to open said control valve upon the bellows being inflated, inlet and outlet pipes provided with check valves and communicating with said upper chamber, and a compression spring bearing at one end against the top of said upper chamber and at its other end on top of said bellows to collapse the latter.

5. A pump comprising a casing, a plate dividing said casing into upper and lower chambers and extending entirely across the space within the casing, said plate having perforations in its central portion, a bellows diaphragm in said upper chamber having its lower end open and its upper end closed, the lower end of the diaphragm being secured to said plate around the perforations therein, an inlet pipe opening into the lower chamber and provided with a check valve opening toward the lower chamber, an inwardly opening control valve at the inner end of said outlet pipe, a valve actuating device arranged to open said control valve upon the bellows being inflated, said valve actuating device including a bell crank lever pivoted in said lower chamber and having one of its arms forked, a stem leading from said valve and having a finger extending between the arms of said fork, and a rod connected to the other arm of said bell crank lever and passing through one of the perforations of the plate and secured to the closed end of said bellows, and inlet and outlet pipes provided with check valves and communicating with said upper chamber.

6. A pump comprising a casing, a plate dividing said casing into upper and lower chambers and extending entirely across the space within the casing, said plate having perforations in its central portion, a bellows diaphragm in said upper chamber having its lower end open and its upper end closed, the lower end of the diaphragm being secured to said plate around the perforations therein, an inlet pipe opening into the lower chamber and provided with a check valve opening toward the lower chamber, an inwardly opening control valve at the inner end of said outlet pipe, a valve actuating device arranged to open said control valve upon the bellows being inflated, said valve actuating device including a bell crank lever pivoted in said lower chamber and having one of its arms forked, a stem leading from said valve and having a finger extending between the arms of said fork, and a rod connected to the other arm of said bell crank and passing through one of the perforations of the plate and secured to the closed end of said bellows, inlet and outlet pipes provided with check valves and communicating with said upper chamber, and a compression spring bearing at one end against the top of said upper chamber and at its other end on top of said bellows to collapse the latter.

Signed at New York, in the county of New York, and State of New York, this 31st day of December, A. D. 1928.

ALLEN A. CANTON.